(12) United States Patent
Rasanen

(10) Patent No.: US 9,042,378 B2
(45) Date of Patent: May 26, 2015

(54) METHOD AND APPARATUS FOR INTERWORKING WITH MEDIA FALLBACK

(75) Inventor: Juha Rasanen, Espoo (FI)

(73) Assignee: Nokia Corporation, Espoo (FI)

( * ) Notice: Subject to any disclaimer, the term of this patent is extended or adjusted under 35 U.S.C. 154(b) by 1813 days.

(21) Appl. No.: 11/834,268

(22) Filed: Aug. 6, 2007

(65) Prior Publication Data

US 2008/0037522 A1 Feb. 14, 2008

Related U.S. Application Data

(60) Provisional application No. 60/836,831, filed on Aug. 10, 2006.

(51) Int. Cl.
*H04L 12/66* (2006.01)
*H04L 29/06* (2006.01)

(52) U.S. Cl.
CPC ...... *H04L 29/06027* (2013.01); *H04L 65/4038* (2013.01)

(58) Field of Classification Search
CPC .............. H04L 65/102; H04L 65/1033; H04L 65/1006; H04L 65/1093
USPC ........................................................ 370/229
See application file for complete search history.

(56) References Cited

U.S. PATENT DOCUMENTS

| 2004/0048612 | A1* | 3/2004 | Virtanen et al. ........... 455/426.1 |
| 2005/0025047 | A1* | 2/2005 | Bodin et al. .................. 370/229 |
| 2005/0058125 | A1* | 3/2005 | Mutikainen et al. .......... 370/354 |
| 2005/0060411 | A1* | 3/2005 | Coulombe et al. ............ 709/227 |
| 2005/0129004 | A1* | 6/2005 | Clevenger ..................... 370/352 |
| 2005/0237933 | A1* | 10/2005 | Marjelund et al. ............ 370/230 |

FOREIGN PATENT DOCUMENTS

| EP | 1370056 A1 | 12/2003 |
| WO | WO 2006/037375 A1 | 4/2006 |
| WO | WO-2006-037375 A1 | 4/2006 |

OTHER PUBLICATIONS

European office action for corresponding EP application No. 07 801 501.3-1244 dated Mar. 29, 2011, pp. 1-5.
Report on alternative architectures for combining CS Bearers with IMS, 3GPP TR 23.899 v.1.0.0 (Dec. 2004), release 6, 3GPP TSG-SA Meeting #26, Dec. 13-16, 2004, pp. 1-54.
3GPP 23.228; V5.13.0 (Dec. 2004) 3rd Generation Partnership Project; Technical Specification Group Services and System Aspects; IP Multimedia Subsystem (IMS); Stage 2 (Release 5) (131 pages).

(Continued)

*Primary Examiner* — Asad Nawaz
*Assistant Examiner* — Jason Harley
(74) *Attorney, Agent, or Firm* — Harrington & Smith

(57) ABSTRACT

An approach is provided for enabling interworking between a first network domain which does not support downgrading of media compositions, and a second network domain which supports downgrading of media compositions. The call with the first media composition is released and a call with a downgraded second media composition is set up by the gateway control function in the first network domain, in response to a rejection of the first call set-up request, by transmitting a second call set-up request for the downgraded second media composition from the gateway control function to the first network domain via the first leg.

19 Claims, 9 Drawing Sheets

(56) References Cited

OTHER PUBLICATIONS

3GPP 23.903; V6.1.0 (Mar. 2005) 3rd Generation Partnership Project; Technical Specification Group Services and System Aspects; Redial solution for voice-video switching (Release 6) (18 pages).

3GPP 29.163; V6.8.0 (Mar. 2006) 3rd Generation Partnership Project; Technical Specification Group Core Network and Terminals; Interworking between the IP Multimedia (IM) Core Network (CN) subsystem and Circuit Switched (CS) networks (Release 6) (129 pages).

3GPP 24.229; V5.12.0 (Mar. 2005) 3rd Generation Partnership Project; Technical Specification Group Core Network; IP Multimedia Call Control Protocol based on Session Initiation Protocol (SIP) and Session Description Protocol (SDP); Stage 3 (Release 5) (90 pages).

3GPP 29.332; V6.5.0 (Mar. 2006) 3rd Generation Partnership Project; Technical Specification Group Core Network and Terminals; Media Gateway Control Function (MGCF)—IM Media Gateway; Mn Interface (Release 6) (45 pages).

3GPP 23.002; V6.4.0 (Mar. 2004) 3rd Generation Partnership Project; Technical Specification Group Services and Systems Aspects; Network architecture (Release 6) (53 pages).

IETF "Internet Standards;" http://www.ietf.org/rfc/rfc2026.txt IEFT Internet Standards.

ITU-T H.263; Series H: Audiovisual and Multimedia Systems—Infrastructure of audiovisual service—Coding of moving video; *Video Coding for low bit rate Communication*; Jan. 2005 (226 pages).

ITU-T 11.261: Line Transmission of Non-Telephone Signals; *Video Codec for Audiovisual Services at p ×64 kbits*; Mar. 1993 (29 pages).

Chen; Hsiao-Hwa; *Next Generation CDMA Technology*; "3. CDMA-Based 2G and 3G Systems, Section 3.1, EIA/TIA IS 95 System, pp. 75-95, 2007.

* cited by examiner

METHOD AND APPARATUS FOR INTERWORKING WITH MEDIA FALLBACK

RELATED APPLICATIONS

This application claims the benefit of the earlier filing date under 35 U.S.C. §119(e) of U.S. Provisional Application Ser. No. 60/836,831 filed Aug. 10, 2006, entitled "Interworking with Media Fallback," the entirety of which is incorporated herein by reference.

BACKGROUND

In order to achieve access independence and to maintain a smooth interoperation with wired terminals across the Internet, an IP multimedia subsystem (IMS) core network, specified e.g., in the 3GPP (Third Generation Partnership Project) specification TS 23.228, has been developed to be conformant to IETF (Internet Engineering Task Force) "Internet Standards". The IMS enables network operators of mobile or cellular networks to offer their subscribers multimedia services based on and built upon Internet applications, services and protocols. The intention is to develop such services by mobile network operators and other third party suppliers including those in the Internet space using the mechanisms provided by the Internet and the IMS. The IMS thus enables conversion of, and access to, voice, video, messaging, data and web-based technologies for wireless users, and combines the growth of the Internet with the growth in mobile communications.

In this connection, it is also studied how interworking between 3GPP IMS and legacy circuit-switched (CS) core network domains of regular telephone users, such as users of second or third generation mobile networks, fixed public-switched telephone networks (PSTN) or fixed integrated services digital networks (ISDN), can be achieved. "Interworking" means that systems or components, possibly from different origins, work together to perform some task. Thus, interworking depends on standards to define the interfaces between the components. The term implies that there is some difference between the components which, in the absence of common standards, would make it unlikely that they could be used together. For example, software from different companies, running on different hardware and operating systems can interwork via standard network protocols.

A cellular network, i.e., a Public Land Mobile Network (PLMN) can be regarded as an extension of networks with CS domains and packet switched (PS) domains within a common numbering plan and a common routing plan. The PLMN infrastructure is logically divided into a core network (CN) and an access network (AN) infrastructure, while the CN infrastructure is logically divided into a CS domain, a PS domain and an IMS. The CS and PS domains differ by the way they support user traffic. These two domains are overlapping, i.e., they contain some common entities. A PLMN can implement only one domain or both domains. In particular, the CS domain refers to the set of all CN entities offering CS type of connections for user traffic as well as all the entities supporting the related signaling. A CS type of connection is a connection for which dedicated network resources are allocated at the connection establishment and released at the connection release. The PS domain refers to the set of all CN entities offering PS type of connections for user traffic as well as all the entities supporting the related signaling. A PS type of connection transports the user information using autonomous concatenation of bits called packets, wherein each packet can be routed independently from the previous one. The IMS domain comprises all CN elements for provision of IP multimedia services comprising audio, video, text, chat, etc. and a combination of them delivered over the PS domain.

The Session Initiation Protocol (SIP) is an application-layer control protocol which can be used in IP based networks, such as the IMS, for creating, modifying and terminating sessions with one or more participants. These sessions include Internet multimedia conferences, Internet telephone calls and multimedia distribution. Members in a SIP session can communicate via multicast or via a mesh of unicast relations, or a combination of these. In the full end-to-end use of SIP no specific requirements for interworking between non-SIP users, not having a SIP capable terminal equipment, have been considered.

On the other hand, CS networks may use a signaling protocol called Common Channel Signaling System #7 (more commonly called "SS7" or "C7"). In SS7 networks, ISUP (Integrated Services Digital Network (ISDN) User Part) signaling messages are used to set-up, manage and release calls between central office switches. ISUP messages also carry caller ID information, such as the calling party's telephone number and name. ISUP is used for both ISDN and non-ISDN calls between central office switches.

In 3GPP Rel-6 specification TR 23.903, re-dialing scenarios are defined to be performed by a terminal device (or user equipment (UE) in 3GPP terminology) when the called party does not support the requested video call, or when the call needs to swap between speech and video or vice versa. The UEs terminate the ongoing call and one of the UEs initiates a new call (i.e., redialing).

Additionally, 3GPP Rel-6 has produced a specification TS 29.163 for speech/audio interworking between IMS and CS networks.

However, when an IMS terminal tries to make a multimedia or video call to a CS terminal that is behind an ISUP leg, the IMS/CS interworking point (e.g., media gateway control function (MGCF)) will turn the request to a video-only request to the ISUP leg, because the ISUP network does not support downgrading of media compositions, i.e., there is no fallback mechanism in ISUP. The video call set-up will then always fail when the called terminal does not support video calls or when the called user does not want to receive a video call or when the terminating network does not support a video call.

More generally, when a terminal in a domain (second domain) supporting downgrading of the media composition (i.e., removing one or more of the requested or used media components) tries to make a multimedia call to another terminal in another domain (first domain) that does not support downgrading of the media composition, the domain interworking point will have to use a fixed media composition towards the second domain. The call set-up will then always fail when the called terminal does not support the requested fixed media composition or when the called user does not want to receive a call with the requested fixed media composition or when the terminating network does not support the requested fixed media composition.

SOME EXEMPLARY EMBODIMENTS

Therefore, there is a need for an approach to provide a method and system for enabling flexible interworking between a domain supporting downgrading of the media composition (i.e., removing one or more of the requested or used media components), e.g., an IP based domain, and a domain not supporting downgrading of the media composition, e.g., a legacy ISUP circuit-switched domain.

According to one embodiment of the invention, a method comprises: starting to establish a call or session with a first media composition in a first leg of a first network domain which does not support downgrading of media compositions, by transmitting a first call set-up request for said first media composition to said first network domain in response to the receipt of a set-up message for said first media composition at a gateway control function from a second network domain which supports downgrading of media compositions; releasing said call or session and setting up a call or session for a downgraded second media composition in said first network domain by said gateway function, in response to a rejection of said first call set-up request, by transmitting a second call set-up request from said gateway function to said first network domain via said first leg; and updating a call or session in a second leg of said second network domain by said gateway function to match said downgraded media composition being established in said first leg.

According to another embodiment of the invention, a gateway device comprises: a call control unit for establishing a first call with a first media composition in a first leg of a first network domain, which does not support downgrading of media compositions, said call control unit comprising at least one call set-up unit configured to transmit a first call set-up request for said first media composition to said first network domain via said first leg in response to the receipt of a set-up message for said first media composition; and a session control unit for establishing a session with said first media composition in a second leg of a second network domain which supports downgrading of media compositions, in response to the receipt of said set-up message; wherein said at least one call set-up unit is configured to transmit a second call set-up request for a downgraded second media composition to said first network domain via said first leg in response to the receipt of a rejection message which indicates rejection of said first call set-up request; and wherein said session control unit is configured to update said session with said first media composition in said second network domain to match the call with said downgraded second media composition being established in said first leg.

According to yet another embodiment of the invention, a computer program product comprises code means for producing the above method steps when run on a computer device.

Accordingly, usability and flexibility can be added in call and/or session establishment from network domains (second network domains such as IP based networks or other packet switched networks) supporting media downgrading to network domains (first network domains such as CS networks or other legacy networks) not supporting media downgrading. Thus, a fallback to a downgraded media composition (e.g., speech) can be provided even if the first network domain is inherently a non-fallback network. Moreover, standard devices for the second network domain can be used, while no extra decision logic is required at these terminals (or from the user) for making a new set-up trial in case of a failure.

According to an exemplary embodiment, when the called party rejects the first call setup, the gateway control function or device sets up a new call on the terminating leg and may thus maintain the originating leg. Then the gateway control function or device modifies the originating leg and connects it with the new call on the terminating leg. From the user's point of view the whole procedure appears as a (service) fallback.

It is to be pointed out that the first and second media compositions could be any single medium or any media combination and is by no means intended to be restricted to the compositions described in the exemplary embodiments. The same applies to the first and second network domains. In particular, the result of the proposed fallback procedure may be not only audio/speech but any single media or media combination.

Additionally, it is to be noted that the term "call leg" is used to designate a logical connection between two gateways or switches or between a gateway or a switch and a terminal device. As a simple example, when a number is dialed, one active call leg is set up. When the other party picks up, and the two lines are connected together, two call legs are in action.

The first leg may be connected to the second leg in the second network domain, to form a single connection.

The second leg may be established in response to the receipt of the set-up message at the gateway control function, and maintained after the rejection of the first call set-up request.

Additionally, an update message may be transmitted via the second leg to update the media to the downgraded second media composition. In a first example, the update message may be a SIP UPDATE message. In an alternative second example, the update message may be a SIP 200 OK response.

As a specific example, the set-up message may be a SIP message or any other IP based message which triggers set-up of a session. The first and second call set-up requests may be initial address messages.

Further, the rejection of the first call set-up request may be signaled by a release message.

In a particular implementation example, the second network domain is an IP multimedia subsystem and the first network domain is a circuit switched network. In this specific case, the method may comprise establishing a multimedia or video call in an Integrated Services Digital Network User Part (ISUP) leg of a circuit-switched network in response to a multimedia or video session establishment with a Session Initiation Protocol (SIP) INVITE message at a media gateway control function, by transmitting an ISUP initial address message (IAM) for the multimedia or video call to the circuit-switched network via the ISUP leg; releasing the multimedia or video call and establishing a speech-only call in the ISUP leg of the circuit-switched network, in response to the receipt of an ISUP Release (REL) message, by transmitting an ISUP IAM for a speech-only call to the circuit-switched network via the ISUP leg.

Additionally, the gateway device may comprise an interworking unit (e.g., media gateway (MGW)) for connecting the first leg to the second leg established in the second network domain, to form a single connection.

Furthermore, the gateway device, which may be a media gateway control function, may comprise a session control unit for establishing the second leg in response to the receipt of the set-up message, and for maintaining the second leg after the rejection of the first call set-up request. The session control unit may be configured to transmit the update message via the second leg to update the media to the downgraded media composition.

Further advantageous modifications or developments are defined in the dependent claims.

Still other aspects, features, and advantages of the embodiments of the invention are readily apparent from the following detailed description, simply by illustrating a number of particular embodiments and implementations, including the best mode contemplated for carrying out the embodiments of the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings and in which like reference numerals refer to similar elements and in which.

DESCRIPTION OF PREFERRED EMBODIMENTS

An apparatus, method, and software for providing interworking with media fallback are described. In the following description, for the purposes of explanation, numerous specific details are set forth in order to provide a thorough understanding of the invention. It is apparent, however, to one skilled in the art that the invention may be practiced without these specific details or with an equivalent arrangement. In other instances, well-known structures and devices are shown in block diagram form in order to avoid unnecessarily obscuring the invention.

The embodiment will now be described based in an exemplary architecture in which an Internet Protocol (IP) based network is connected to a Circuit-Switched (CS) network via a gateway device with an interworking functionality. However, the invention can be applied to any other network combination.

Figure 1:
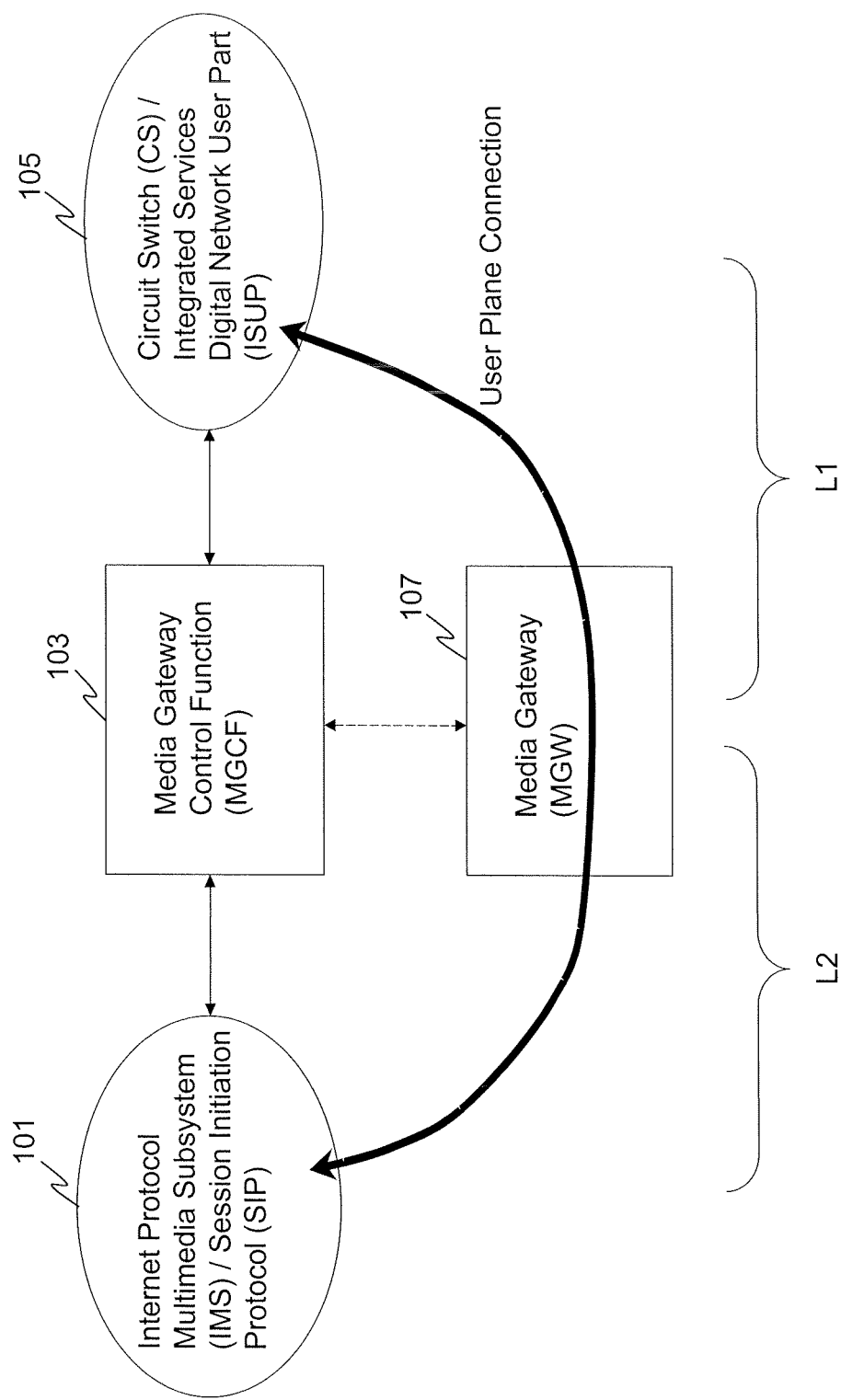
FIG. 1 shows a schematic diagram of a network configuration capable of providing flexible interworking, in accordance with an embodiment of the invention.

FIG. 1 shows a schematic block diagram of the exemplary network architecture according to one embodiment, wherein an IP based network 101, e.g., a SIP based IMS network, is connected to a CS network 105, e.g., an ISUP-based network, via a gateway device, e.g., a media gateway control function (MGCF) 103, which controls a media gateway (MGW) 107. The gateway device 103 is arranged to control the parts of a call state which pertain to connection control for media channels in the media gateway 107. It may communicate with call session control functions (CSCFs), e.g., as defined in the 3GPP specification TS 23.228.

The gateway functionality may be achieved at the gateway device 103 by performing protocol conversion between CS-based and the IP based call control protocols, e.g., between ISUP and SIP call control protocols.

The media gateway 107 is arranged to terminate bearer channels from the CS network 30, and media streams from a IP based network 101. The media gateway 107 may support media conversion, bearer control and payload processing. It interacts with the gateway device 103 for resource control, owns and handles resources such as echo cancellers etc., and may comprise corresponding codec functions.

Interworking between the IP based network 101 and the CS network 105 may be achieved by using the INVITE method, e.g., in a SIP based functionality for setting-up a session. In particular, capability is added for subscribers located in the CS network 105 to be invited in a conference or call initiated by using the respective SIP functionality. To achieve this, a SIP user sends an INVITE message towards the gateway device 103, where the request Uniform Resource Identifier (URI) may be a telephony URI (TEL URI), such as "+442345567@operator.com". When the gateway device 103 receives the INVITE message, it may first send an ISUP initial address message (IAM) to the CS network 105 to thereby establish a first call leg L1 towards the terminal device of the subscriber located in the CS domain, i.e., the CS network 101. Then, the gateway device 103 establishes a second call leg L2 towards the SIP user whose terminal device or UE is connected to the IP based network 101. The SIP user can also be e.g., a conference device.

After having established both call legs L1 and L2 the gateway device 103 connects these call legs to one session, wherein the user plane connections UPC are connected via the media gateway 107. In the above specific example, the gateway device 103 maps the received SIP INVITE message to the ISUP IAM to be forwarded to the CS network 105.

In the SIP based example, a call leg is identified by the combination of call-ID, originator (From header) and final recipient (To header). SIP Uniform Resource Locators (URLs) may be used within SIP messages to indicate the originator, current destination (Request-URI) and final recipient of a SIP request, and to specify redirection addresses.

As an alternative, the Bearer Independent Call Control (BICC) protocol may be used instead of ISUP when the invited party is located outside the IMS but IP bearer can still be utilized in the gateway device 103 towards the invited party.

Figure 2:
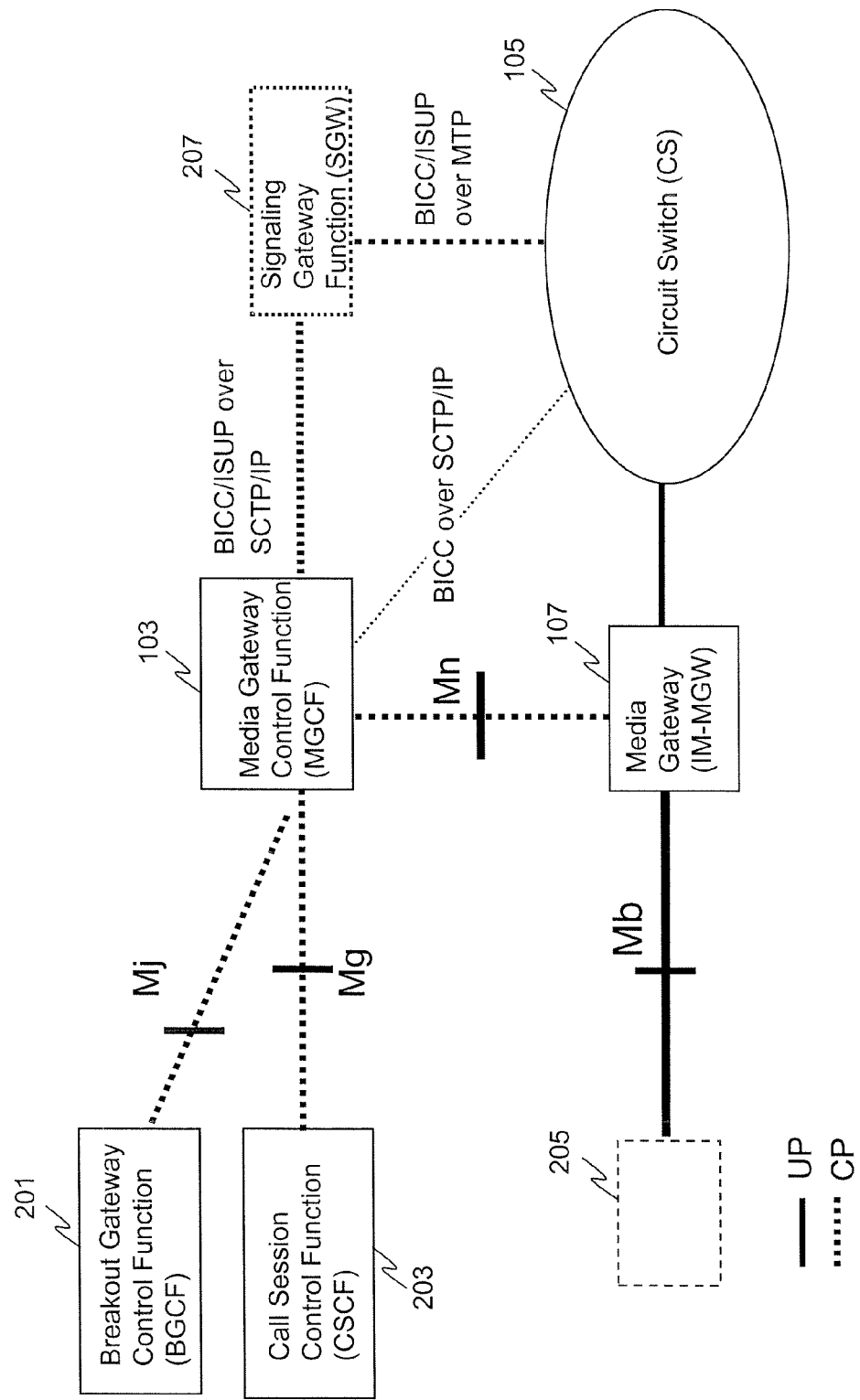
FIG. 2 shows a schematic diagram of an IP (Internet Protocol) multimedia subsystem (IMS) to circuit switched (CS) network logical interworking architecture, in accordance with an embodiment of the invention.

FIG. 2 details shows a schematic block diagram of a more specific architecture of a reference model required to support interworking between 3GPP IMS and CS networks according to one embodiment.

The call control protocol which may be applied across an Mg reference point between a CSCF 203 and the gateway device (e.g., MGCF) 103, may be based on the 3GPP profile of SIP as defined in accordance with the 3GPP specification TS 24.229. Additionally, an Mn reference point describes the interfaces between the gateway device 103 and the media gateway (e.g., MGW) 107, and may have properties as detailed in the 3GPP specification TS 29.332.

The call control protocol which may be applied across an Mj reference point between a breakout gateway (e.g., breakout gateway control function (BGCF)) 201 and the gateway device 103 may be based on the 3GPP profile of SIP as defined in accordance with the 3GPP specification TS 24.229.

Furthermore, an Mb reference point provides a connection between the media gateway 107 and various network entities 205, such as a user equipment (UE) (e.g., via a General Packet Radio Services (GPRS) Tunnel Protocol (GTP) Tunnel to a GPRS Gateway support node (GGSN)), a multimedia resource function processor (MRFP), or an application server, e.g., in accordance with the 3GPP specification TS 23.002, which is IPv6 based.

A signaling gateway function (SGW) 207 is configured to perform call related signaling conversion to or from BICC/ISUP based message transfer part (MTP) transport networks to BICC/ISUP based stream control transmission protocol (SCTP/IP) transport networks, and forwards the converted signaling to or from the gateway device 103. The functionality within the SGW 207 may be in accordance with the 3GPP specification TS 23.002.

The gateway device 103 is configured to control the media gateway 107 and provides a control plane interface to perform SIP to BICC or SIP to ISUP call related signaling interworking. This functionality may be in accordance with the 3GPP specification TS 23.002.

The media gateway 107 provides a user plane interface between the IP based domain and the CS domain. This functionality may be in accordance with 3GPP specification TS 23.002.

According to one embodiment, when an IMS UE establishes a multimedia/video session via the CSCF 203 and the gateway device 103 towards a CS UE behind a CS leg (e.g., ISUP leg) in the CS network 105, the interworking point, i.e., the gateway device 103, sends a corresponding video call setup towards the called party in the CS network 105.

If the CS network 105 or the called party rejects the video call setup, possibly with a cause code indicating the reason for the rejection, the gateway device 103 maintains the multimedia/video session being established in the IP based network, sends a new setup with a speech-only request to the called party, and continues the leg establishment with speech only.

Figure 3:
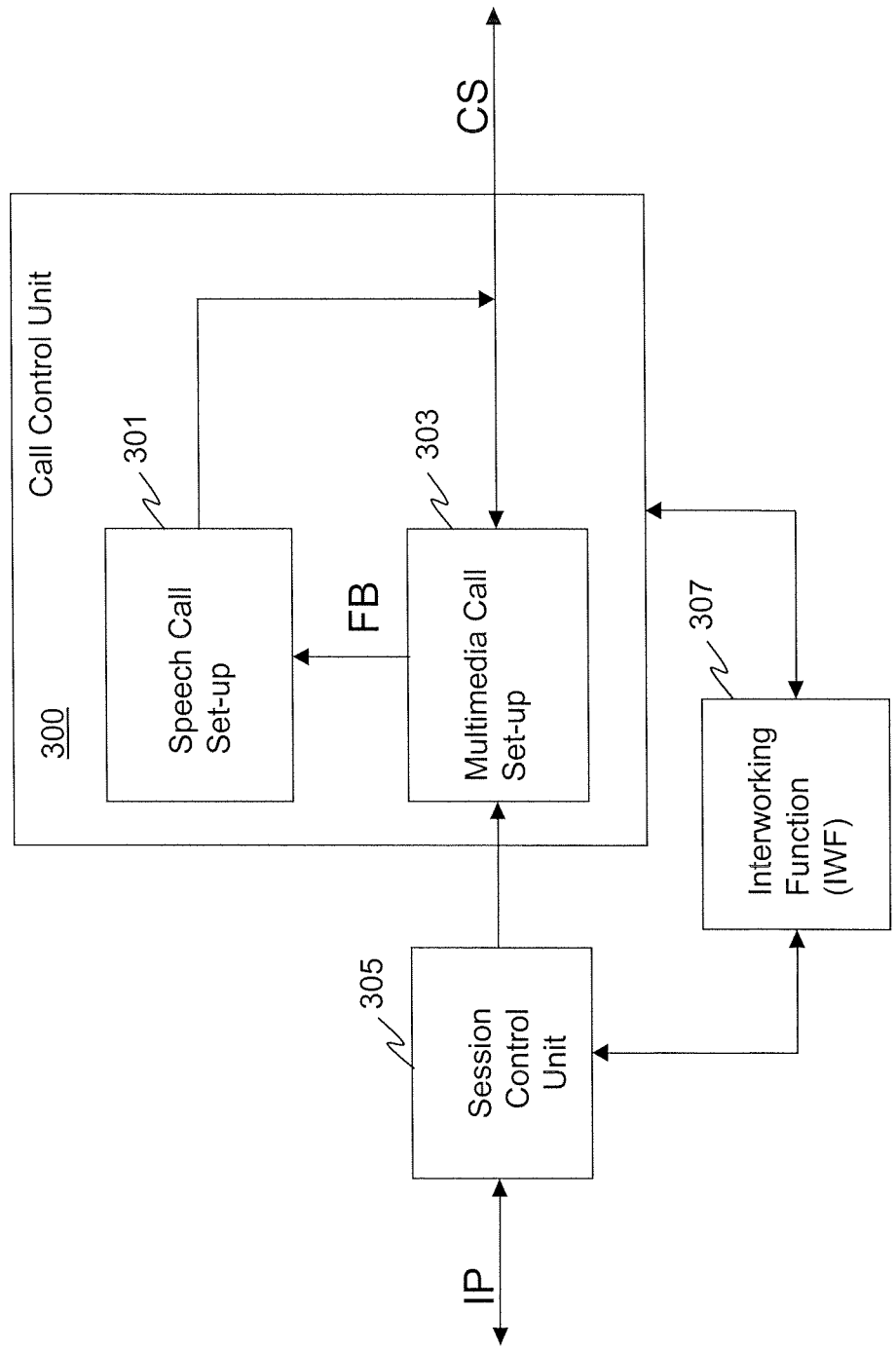
FIG. 3 shows a schematic block diagram of a gateway device, in accordance with an embodiment of the invention.

FIG. 3 shows a schematic block diagram indicating those functionalities of the gateway device 103, which are relevant for understanding the embodiment.

A session control functionality or unit 305 is configured to transmit, receive, process and generate session control signaling required to establish and maintain the IP based leg towards the IP based network (e.g., IMS network). Additionally, a call control functionality or unit 300 is configured to transmit, receive, process and generate call control signaling for the CS leg towards the CS network 105. When both legs have been established, they are connected via an interworking function 307 (which may be for example the MGW 40 of FIGS. 1 and 2) to obtain a single connection.

When the session control unit 305 receives a multimedia or session set-up message, e.g., a SIP INVITE message, it triggers or activates a multimedia (MM) call set-up functionality or unit 303, which may be provided in the call control unit 300, to initiate a call set-up procedure at the call control unit 300 for establishing a video or multimedia call. In response to the receipt of a subsequent set-up release message at the call control unit 300, the MM call set-up unit 303 triggers or activates a fallback (FB) to a speech call set-up functionality or unit 301 which may also be provided in the call control unit 300 and which accordingly initiates a call set-up procedure at the call control unit 300 for the speech call.

It is however noted that the speech call set-up and MM call set-up units 301, 303 may be arranged as a single integrated unit which provides control signaling for the CS legs, or may even be provided outside the call control unit 300.

Additionally, it is noted that the functionalities described in connection with FIG. 3 may be implemented as discrete hardware or signal processing units, or alternatively as software routines or programs controlling a processor or computer device to perform the processing steps of the above functionalities.

Figure 4:
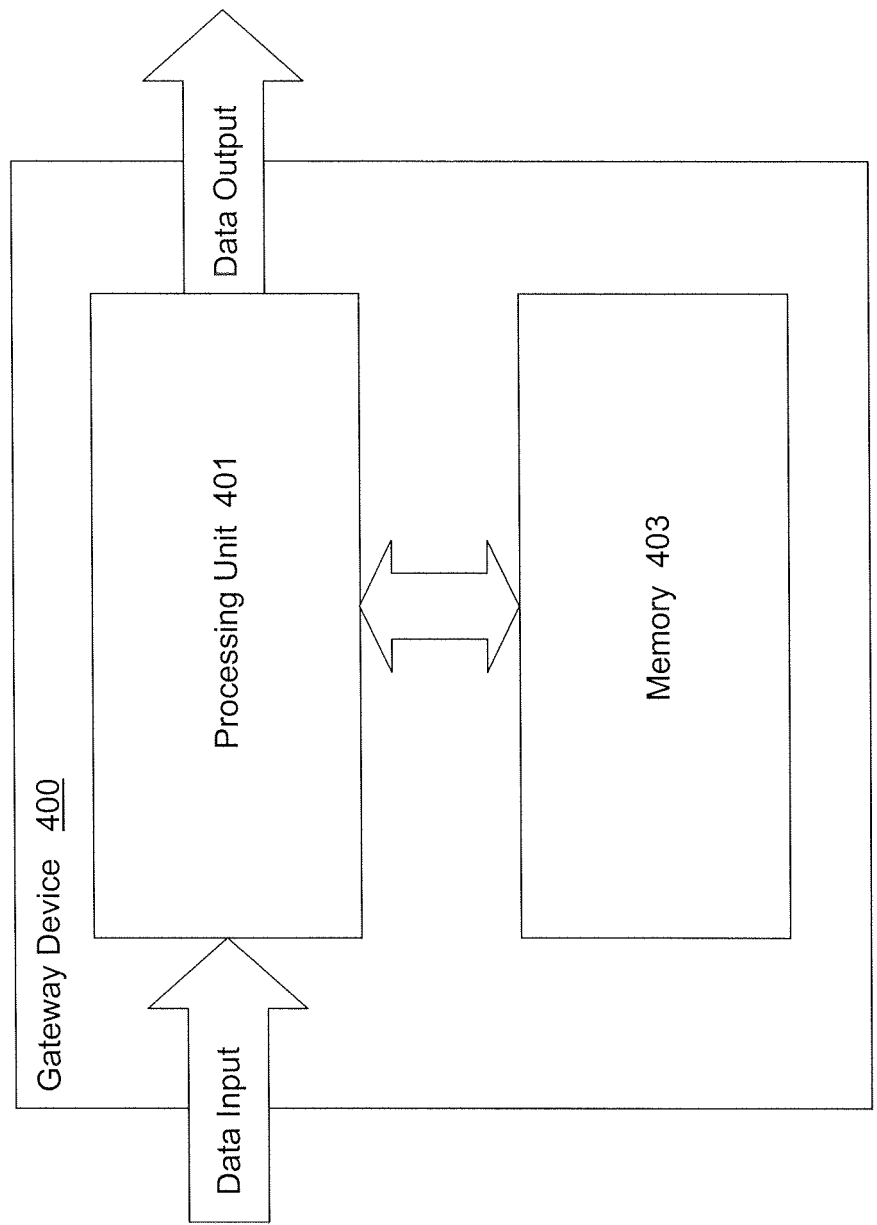
FIG. 4 shows a schematic block diagram of a computer-based implementation, in accordance with an embodiment of the invention.

FIG. 4 shows a schematic block diagram of a software-based implementation of the embodiment. Here, the gateway device 400 comprises a processing unit 401, which may be any processor or computer device with a control unit which performs control based on a software routines of a control program stored in a memory 403 provided in or at the gateway device 400. Program code instructions are fetched from the memory 403 and are loaded to the control unit of the processing unit 401 in order to perform the processing steps of the above functionalities described in connection with FIG. 3. These processing steps may be performed on the basis of input data DI and may generate output data DO, wherein the input and output data DI, DO may be related to the control signaling required at the gateway device 400.

Figure 5:
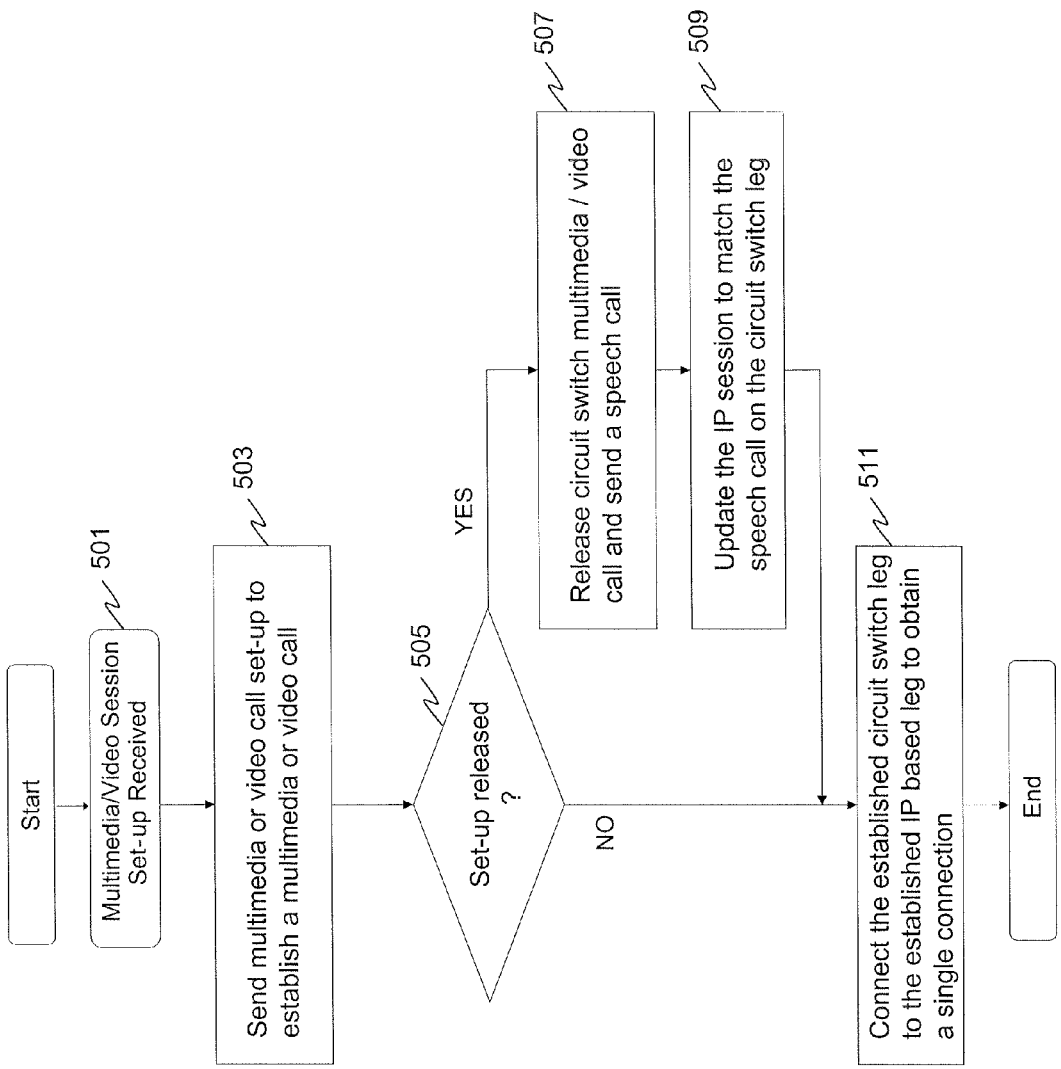
FIG. 5 shows a schematic flow diagram of a control method, in accordance with an embodiment of the invention.

FIG. 5 shows a schematic flow diagram indicating the interworking method achieved by the control processing at the gateway device 400 according to one embodiment. The processing of FIG. 5 starts in response to the receipt of a multimedia or video session set-up message from the IP based network, per step 501.

In step 503, the call control unit 300 is controlled by the MM call set-up unit 303 to send a multimedia or video call set-up request via the CS leg to establish a multimedia or video call. Then, in step 505, it is checked by the call control unit 300 or by the MM call set-up unit 303 whether a set-up release message or indication is received from the CS network 105. If so, the CS multimedia or video call is released and a speech call set-up request is send in step 507 to establish a speech call, based on a control of the speech call set-up unit 301 which has been triggered by the MM call set-up unit 303 (or alternatively by the call control unit 300).

In step 509 the IP based leg is updated to match the speech call in the CS leg, i.e., the video media stream/media component is dropped from the IP based leg.

The procedure continues with step 511, where the CS leg and the IP based leg are connected via the interworking function 307 of the gateway device 400 (e.g., the MGW 107) to obtain a single connection between the calling IP based terminal device (or UE) and the called CS terminal device (or UE). If it is determined in step 505 that no set-up release has been signaled by the CS network 105, the procedure also continues with the step 511.

Figure 6:
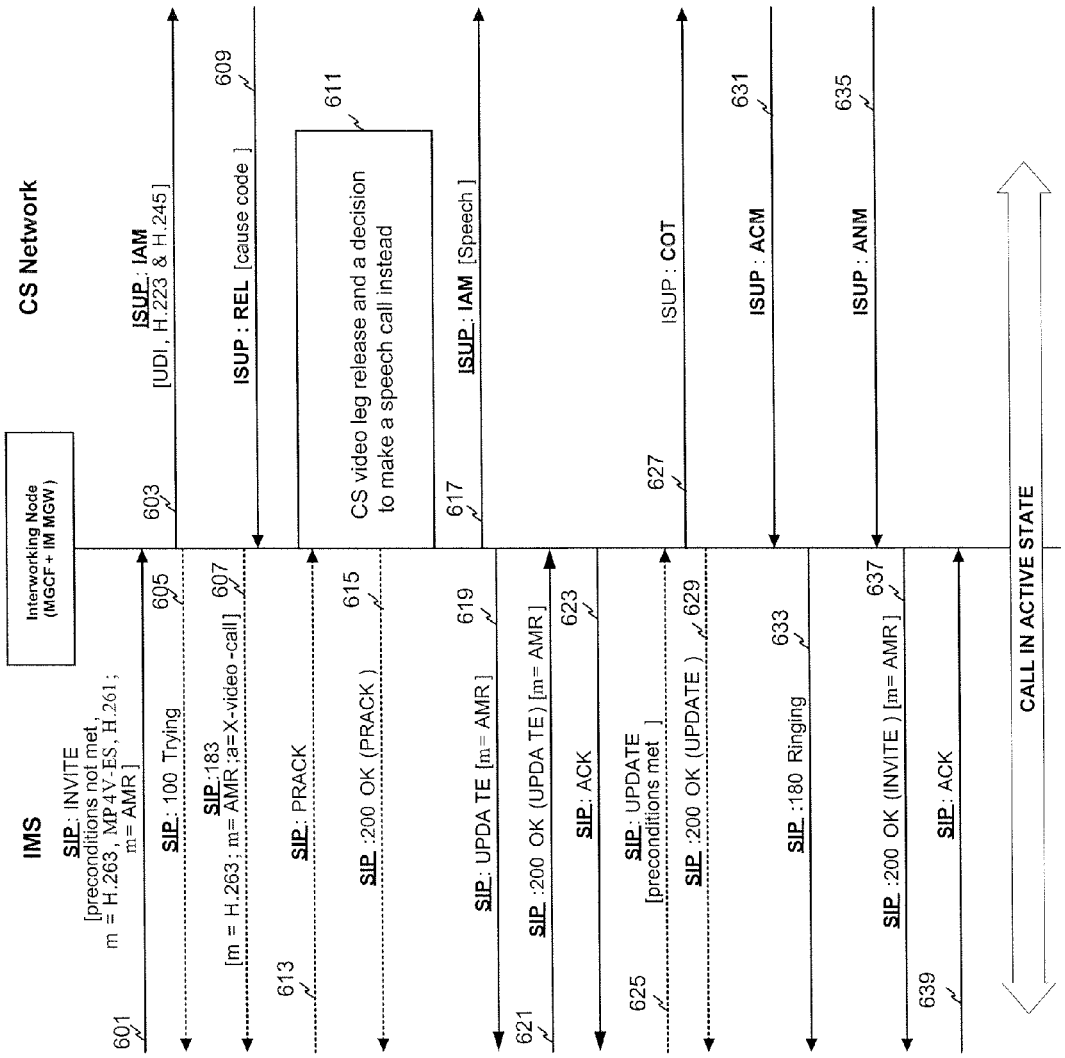
FIG. 6 shows a signaling diagram indicating an interworking signaling, when Session Initiation Protocol (SIP) preconditions are used, in accordance with an embodiment of the invention.

FIG. 6 shows a more detailed signaling diagram of a first implementation example of the embodiment, which is based on a specific implementation example related to an interworking between a SIP based IMS network and an ISUP-based CS network. In this first example, SIP preconditions are used.

In step 601, a multimedia session is established from the IMS network with a SIP INVITE message indicating possible multimedia protocols (H.263, H.261) and codecs (MP4V-ES, AMR) and that preconditions are not met. In response to this SIP INVITE message, the gateway device 103 transmits in step 603 an ISUP IAM message via the CS leg. Thereby, the desired video call establishment from the gateway device 103 towards the CS party is initiated with the ISUP IAM message. In steps 605 and 607, a SIP 100 Trying message and a subsequent SIP 183 acknowledgement indicating selected video codec (H.263) and audio codec (AMR) are returned to the SIP party. Then, in step 609, an ISUP REL message with a cause code is received from the CS network 105. In response thereto, the CS video call is released and a decision is made at the gateway device 103 to initiate a speech call instead (step 611).

Meanwhile, the IMS party has issued a SIP PRACK message (step 613) which is acknowledged by the gateway device 103 with a SIP 200 OK response (step 615) to maintain the IMS leg.

Then, in step 617, an ISUP IAM message for the speech call setup is sent via the CS leg. Thereby, a fallback to speech is automatically initiated at the gateway device 103 by setting up a speech-only call towards the CS party without any signaling or other activity at the IMS party. Additionally, a SIP UPDATE message is transmitted in step 619 by the session control unit 305 of the gateway device 103 towards the IMS party in order to update the media of the IMS leg to audio-only. The media update is acknowledged by the IMS party in step 621 with a SIP 200 OK (UPDATE) message, which is again acknowledged by the gateway device 103 in step 623 with a SIP ACK. In step 625, the IMS party sends a SIP UPDATE message to indicate that preconditions are now met and the interworking function 307 at the gateway device issues in step 627 a corresponding ISUP COT message towards the CS party. The CS network sends in step 631 an ISUP ACM message and the interworking function 307 at the gateway device 103 transmits in step 633 a SIP 180 Ringing message to the IMS party to indicate alerting at the called CS party. Then, in response to the receipt of an ISUP ANM message from the CS party in step 635, the interworking function 307 of the gateway device 103 issues in step 637 a SIP OK (INVITE) message towards the IMS party which responds in step 639 with a finalizing SIP ACK acknowledgement, so that both legs are connected and the call is in an active state.

Figure 7:
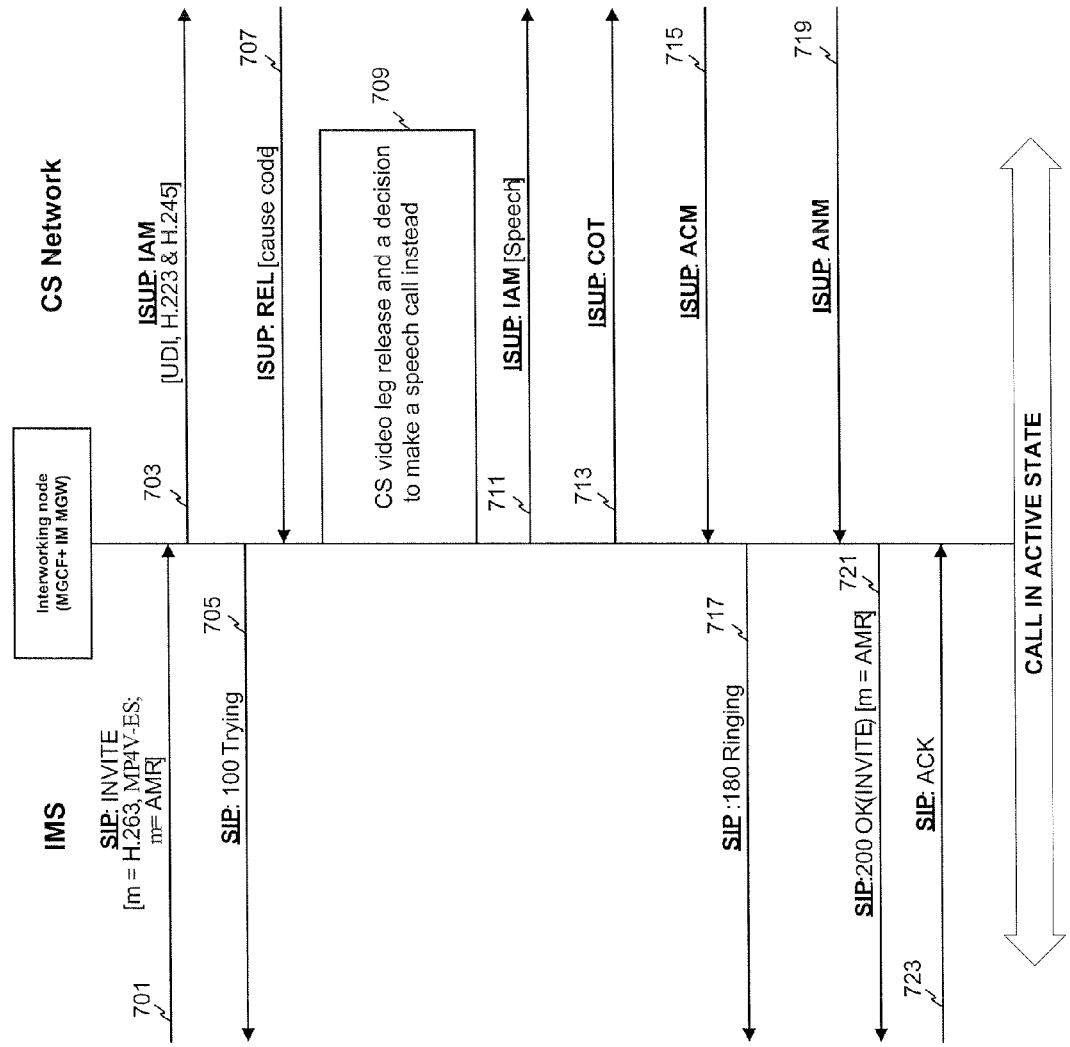
FIG. 7 shows a signaling diagram indicating an interworking signaling, when SIP preconditions are not used, in accordance with an embodiment of the invention.

FIG. 7 shows a corresponding signaling diagram of a second implementation example of the embodiment, which is also based on the above specific implementation example related to the interworking between a SIP based IMS network and an ISUP-based CS network. Contrary to the first example, this second example covers a case where SIP preconditions are not used.

In step 701, a multimedia session is established from the IMS network with a SIP INVITE message indicating possible video codecs (H.263, MP4V-ES) and an audio codec (AMR). In response to this SIP INVITE message, the gateway device 20 transmits in step 703 an ISUP IAM message via the CS leg. Thereby, the desired video call establishment from the gateway device 103 towards the CS party is initiated with the ISUP IAM message. As SIP preconditions are not used here, only a SIP 100 Trying message is returned in step 705 to the SIP party. Then, in step 707, an ISUP REL message with a cause code is received from the CS network 105. In response thereto, the CS video call is released and a decision is made at the gateway device 103 to initiate a speech call instead (step 709).

Then, in step 711, an ISUP IAM message for the speech call setup is sent via the CS leg. Thereby, a fallback to speech is automatically initiated at the gateway device 103 by setting up a speech-only call towards the CS party without any signaling or other activity at the IMS party. In step 713, the gateway device 103 sends an ISUP COT message towards the CS party. The CS network sends in step 715 an ISUP ACM message and the gateway device 103 transmits in step 717 a SIP 180 Ringing message to the IMS party to indicate alerting at the called CS party. Then, in response to the receipt of an ISUP ANM message from the CS party in step 719, the gateway device 103 issues in step 721 a SIP OK (INVITE) message with indication of only an AMR speech codec (speech only) towards the IMS party which responds in step 723 with a finalizing SIP ACK acknowledgement, so that both legs are connected and the call is in an active state.

Thus, as no preconditions are used here, the update of the IP session can be performed simply by the 200 OK response to the SIP INVITE. The SIP UPDATE message and some other messages (indicated as dotted arrows in FIG. 6) of the first example are not required, so that signalling load can be reduced.

To summarize, a method, network system, gateway device, and computer program product have been described, for enabling interworking between a first network domain which does not support downgrading of media compositions, and a second network domain which supports downgrading of media compositions. Establishment of a call with a first media composition is started in a first leg of the first network domain, by transmitting a first call set-up request for the first media composition from a gateway control function to the first network domain in response to the receipt of a set-up message at the gateway control function from a second network domain. The call with the first media composition is released and a call with a downgraded second media composition is set up by the gateway control function in the first network domain, in response to a rejection of the first call set-up request, by transmitting a second call set-up request for the downgraded second media composition from the gateway control function to the first network domain via the first leg. A session with the first media composition is updated in the second network domain to match the call with the downgraded second media composition being established in the first leg. Thereby, a fallback to the downgraded second media composition is supported even if the first network domain is inherently a non-fallback network, while standard terminals for the second network domain can still be used and no user interference in the second network domain is required.

It is to be noted that the present invention is not restricted to the embodiments described above, but can be implemented in other gateway devices or functionalities where interworking between a fallback capable network (i.e., a network that supports downgrading of the media composition of a session by removing one or more media components, for example removing the video component from the original composition of audio and video), e.g., an IP based network, and a network not supporting fallback, e.g., a legacy ISUP, network is provided. Any set-up message from a fallback capable network may trigger the proposed procedure with initial first call set-up for the requested first media composition and subsequent autonomous fallback to the second call set-up for a downgraded second media composition. Thus, the medium to which fallback is initiated does not necessarily have to be speech/audio. It can be any medium or media composition. The described mechanism can be applied also for example to a fallback from multimedia (with audio, video, data, etc.) to audio and video or to any single medium or any other media composition requested in the original session establishment request. Hence, the various embodiments can be implemented in any interworking procedure involving a fallback capable domain, like an IP based domain, and a non-fallback capable domain, like a legacy CS network domain.

One of ordinary skill in the art would recognize that the processes for enabling interworking between a first network domain which does not support downgrading of media compositions, and a second network domain which supports downgrading of media compositions may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 6.

Figure 8:
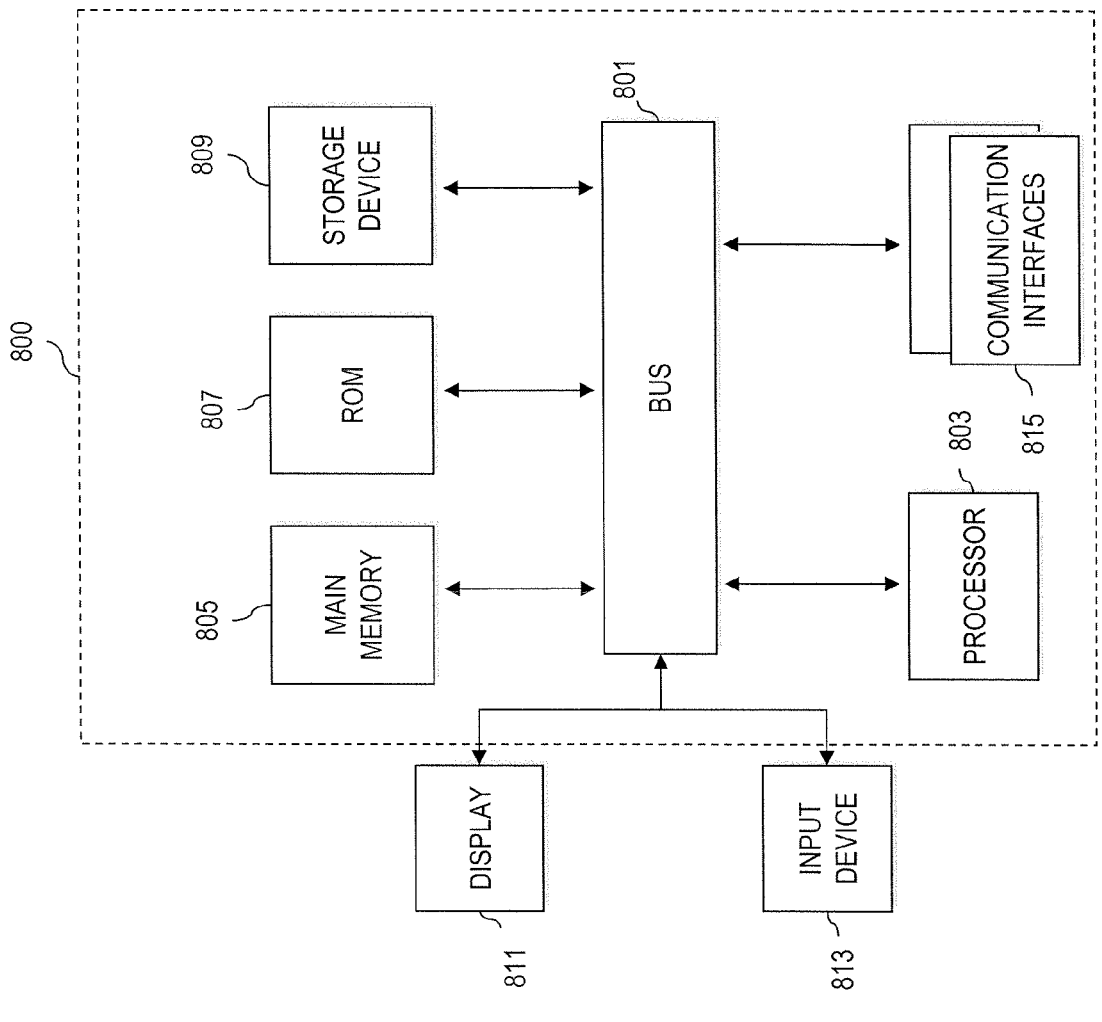
FIG. 8 is a diagram of hardware that can be used to implement various embodiments of the invention.

FIG. 8 illustrates exemplary hardware upon which various embodiments of the invention can be implemented. A computing system 800 includes a bus 801 or other communication mechanism for communicating information and a processor 803 coupled to the bus 801 for processing information. The computing system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computing system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computing system 800 may be coupled via the bus 801 to a display 811, such as a liquid crystal display, or active matrix display, for displaying information to a user. An input device 813, such as a keyboard including alphanumeric and other keys, may be coupled to the bus 801 for communicating information and command selections to the processor 803. The input device 813 can include a cursor control, such as a mouse, a trackball, or cursor direction keys, for communicating direction information and command selections to the processor 803 and for controlling cursor movement on the display 811.

According to various embodiments of the invention, the processes described herein can be provided by the computing system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 800 also includes at least one communication interface 815 coupled to bus 801. The communication interface 815 provides a two-way data communication coupling to a network link (not shown). The communication interface 815 sends and receives electrical, electromagnetic, or optical signals that carry digital data streams representing various types of information. Further, the communication interface 815 can include peripheral interface devices, such as a Universal Serial Bus (USB) interface, a PCMCIA (Personal Computer Memory Card International Association) interface, etc.

The processor 803 may execute the transmitted code while being received and/or store the code in the storage device 809, or other non-volatile storage for later execution. In this manner, the computing system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
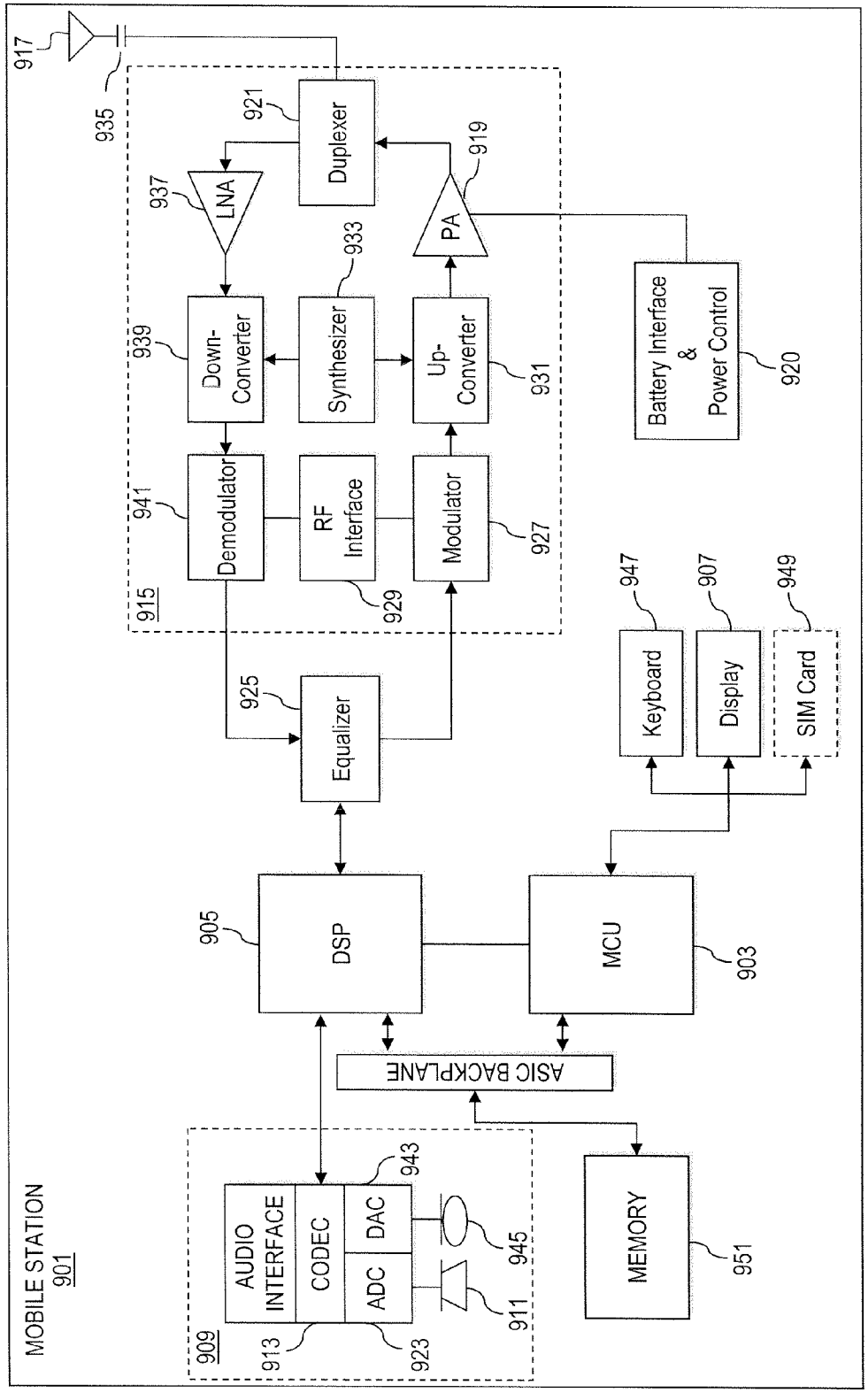
FIG. 9 is a diagram of exemplary components of a mobile station capable of operating in the system of FIG. 1, according to an embodiment of the invention.

FIG. 9 is a diagram of exemplary components of a mobile station (e.g., handset) capable of operating in the system of FIG. 1, according to an embodiment of the invention. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system (e.g., systems of FIG. 7A or 7B), via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The MCU 903 delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations, it is contemplated that these features can be arranged in any combination and order. Exemplary embodiments are provided as follows.

What is claimed is:

1. A method comprising:

receiving, by a gateway control function of a gateway device, a session initiation protocol invite message for a first media composition from a second network domain which supports downgrading of media compositions;

initiating, by the gateway control function of the gateway device, establishment of a first session with the first media composition in a first leg of a first network domain by transmitting a first call set-up request for said first media composition to said first network domain in response to the receipt of said session initiation protocol invite message for said first media composition at the gateway control function from the second network domain which supports downgrading of media compositions;

identifying, by said gateway control function, in response to a rejection message from said first network domain indicating that said first call set-up request for said first media composition in said first leg is rejected by said first network domain;

in response to the identifying, releasing said first session and setting up a second session, wherein an active call state of the first leg is maintained at the gateway device during setting up the second session with said first media composition downgraded to have one or more media components removed in said first network domain by said gateway control function by transmitting a second call set-up request from said gateway function to said first network domain via said first leg; and updating, by the gateway control function, a second leg of said second network domain to match said second session with said downgraded media composition being established.

2. The method according to claim 1, further comprising connecting said first leg to said second leg of said second network domain, to form a single connection.

3. The method according to claim 2, wherein said second leg is established in response to the receipt of said session initiation protocol invite message at said gateway control function and maintained after said rejection of said first call set-up request, and wherein said session initiation protocol invite message is not rejected before the setting up the second session.

4. The method according to claim 3, where the updating comprises sending an update message via said second leg to update the first media composition to said downgraded first media composition.

5. The method according to claim 4, wherein said update message is at least one of a session initiation protocol update message or a session initiation protocol 200 OK response.

6. The method according to claim 1, wherein said second network domain is an interne protocol multimedia subsystem and said first network domain is a circuit switched network.

7. The method according to claim 1, wherein said first and second call set-up requests are initial address messages.

8. The method according to claim 1, wherein said rejection of said first call set-up request is signaled by a release message.

9. The method according to claim 1, wherein said first media composition comprises at least one of a multimedia and a video composition, and wherein said downgraded media composition is speech-only.

10. The method according to claim 1, wherein the first leg is in an integrated services digital network user part leg of a circuit-switched network, wherein the first media composition comprises a multimedia or video call, and wherein the initiating comprises:

establishing, by said gateway control function, the first session with the multimedia or video call in the first leg in the integrated services digital network user part leg of the circuit-switched network in response to a multimedia or video session establishment with the session initiation protocol invite message at a media gateway control function, by transmitting an integrated services digital network user part initial address message for said multimedia or video call to said circuit-switched network via said integrated services digital network user part leg; and releasing, by said gateway control function, said multimedia or video call and establishing the second session comprising a speech-only call in said integrated services digital network user part leg of said circuit-switched network, in response to the receipt of an integrated services digital network user part release message, by transmitting an integrated services digital network user part initial address message for the speech-only call to said circuit-switched network via said integrated services digital network user part leg.

11. An apparatus comprising:
at least one processor; and
at least one memory including computer program code for one or more programs, the at least one memory and the computer program code configured to, with the at least one processor, cause the apparatus to at least:
receive a session initiation protocol invite message for a first media composition from a second network domain which supports downgrading of media compositions;
establish a first session with a first media composition in a first leg of a first network domain;
send a first call set-up request for said first media composition to said first network domain via said first leg in response to the receipt of said session initiation protocol invite message for said first media composition;
identify that said first call set-up request is rejected by said first network domain in response to a rejection message from said first network domain;

in response to the identifying, establish a second session with said first media composition in a second leg of a second network domain which supports downgrading of media compositions;
release said first call session and send a second call set-up request, wherein an active call state of the first leg is maintained at the apparatus during establishing the second session with said first media composition downgraded to have one or more media components removed in said first network domain via said first leg in response to the receipt of a rejection message which indicates rejection of said first call set-up request; and
update said second leg in said second network domain to match said second session with said downgraded media composition being established.

12. The apparatus of claim 11, wherein the at least one memory and the computer program code are configured, with the at least one processor, to cause the apparatus to connect said first leg to said second leg in said second network domain, to form a single connection.

13. The apparatus of claim 11, wherein the at least one memory and the computer program code are configured, with the at least one processor, to cause the apparatus to maintain said second leg after said rejection of said first call set-up request.

14. The apparatus of claim 11, wherein the at least one memory and the computer program code are configured, with the at least one processor, to cause the apparatus to send an update message via said second leg to update the media to said downgraded media composition.

15. The apparatus of claim 14, wherein said update message is a session initiation protocol update message or a session initiation protocol 200 OK response.

16. The apparatus of claim 11, wherein said apparatus is a media gateway control function of an internet protocol multimedia subsystem.

17. A network system comprising:
a gateway device configured to interwork between a first network domain and a second network domain, the gateway device comprising:
a call control unit configured to establish a first session with a first media composition in a first leg of said first network domain, said call control unit comprising at least one call set-up unit configured to send a first call set-up request for said first media composition to said first network domain via said first leg in response to the receipt of a set-up message for said first media composition,
a gateway control function, identifying that said first call set-up request is rejected by said first network domain; and
a session control unit configured, in response to the identifying, to establish a second session with said first media composition in said second network domain, wherein an active call state of the first leg is maintained at the gateway device during establishing the second session with said first media composition downgraded to have one or more media components removed in said first network domain, in response to the receipt of said set-up message, wherein said at least one call set-up unit is configured to release said first session and send a second call set-up request with said first media composition downgraded to have one or more media components removed in said first network domain via said first leg in response to the receipt of a rejection message which indicates the rejection of said first call set-up request, and wherein said session control unit is configured to update said second session with said first media composition in said second network domain to match the call with said downgraded media composition being established.

18. A non-transitory computer-readable storage medium carrying one or more sequences of one or more instructions which, when executed by one or more processors, cause an apparatus to at least perform the method according to claim 1.

19. The apparatus according to claim 11, wherein said first media composition comprises at least one of a multimedia and a video composition, and wherein said downgraded media composition is speech-only.

* * * * *

UNITED STATES PATENT AND TRADEMARK OFFICE
CERTIFICATE OF CORRECTION

| | |
|---|---|
| PATENT NO. | : 9,042,378 B2 |
| APPLICATION NO. | : 11/834268 |
| DATED | : May 26, 2015 |
| INVENTOR(S) | : Rasanen |

It is certified that error appears in the above-identified patent and that said Letters Patent is hereby corrected as shown below:

In the Claims

Claim 6, col. 15, line 12 "interne" should be deleted and --internet-- should be inserted.

Signed and Sealed this
Eighth Day of September, 2015

Michelle K. Lee
*Director of the United States Patent and Trademark Office*